United States Patent [19]

Philipeaux et al.

[11] Patent Number: 4,816,850
[45] Date of Patent: Mar. 28, 1989

[54] FLASH CONDITION INDICATOR DEVICE FOR CAMERAS

[76] Inventors: Eddy J. Philipeaux, 6212 Maxwell Dr., Suitland, Md. 20746; Gerald L. Ehlers, Rte. 1, Box 178, Linden, Va. 22642

[21] Appl. No.: 140,207
[22] Filed: Dec. 31, 1987
[51] Int. Cl.$^4$ .................. G03B 15/03; G03B 17/18
[52] U.S. Cl. .................. 354/127.1; 354/131; 354/132
[58] Field of Search .................. 354/127.1, 131, 132

[56] References Cited

U.S. PATENT DOCUMENTS 4,494,852 1/1985 Smith, Jr. .................. 354/127.1 X Primary Examiner—Michael L. Gellner
Attorney, Agent, or Firm—Larson & Taylor

[57] ABSTRACT

An alarm and control device is provided for a camera system including a camera which, when operated, produces a corresponding synchronizing control pulse; one or more flash or strobe units; and one or more flash sensors which sense the operating state of an associated strobe unit and produce a corresponding output signal. The device includes first and second inputs for receiving, respectively, input signals related to the synchronizing pulses produced by the camera and input signals related to the output signals from a flash sensor, and first and second signal conditioning circuits for conditioning the signals received at the first and second inputs. An output circuit, connected to the strobe unit and to the first signal conditioning circuit, produces an output signal for activating the associated strobe responsive to receipt by the first input of an input signal as aforesaid. The device also includes a first indicator device for indicating proper operation of the camera system, a second indicator device for indicating improper (failed) operation of the camera system, and logic circuitry, connected to the outputs of the first and second signal conditioning circuits, for providing activation of the first indicator device responsive to a first set of signals from the signal conditioning circuits and for providing activation of the second indicator responsive to a second set of signals from the signal conditioning circuits.

12 Claims, 2 Drawing Sheets

FLASH CONDITION INDICATOR DEVICE FOR CAMERAS

FIELD OF THE INVENTION

The present invention relates to an alarm and control device or unit for camera units or systems using strobes, flash lamps and the like.

BACKGROUND OF THE INVENTION

Photographers, and, in particular, professional photographers, have often missed important shots, i.e., have important photographs not turn out as expected because they were unaware at the time of taking the picture that one or more of their strobes did not flash or produced a flash too weak to provide a picture of professional quality, a condition that is often quite difficult to detect. This is a particular problem with professional camera systems which use a plurality of remotely energized strobes, i.e., systems wherein a synchronizing pulse is transmitted by a transmitter associated with the camera to individual receivers associated with remotely located strobes to control the activation of the strobes. It will be appreciated that with such a system a situation can easily occur wherein one or more of the strobes is inoperative or functioning in less than optimum manner without this being detected by the camera operator.

Prior art patents of possible significance insofar as the invention is concerned include: U.S. Pat. Nos. 4,062,027 (Miyazaki et al); 4,316,660 (Ohtsubo et al); 4,344,684 (Tsukaya); 4,431,291 (Maida); 4,469,419 (Ishida et al); 4,494,852 (Smith, Jr.); and 4,518,237 (Mizokami). Briefly considering these patents, the Smith Jr. patent discloses a self-contained photoflash detector which is adapted to be mounted on a camera and which includes a photodetector for sensing the light flash from a camera mounted photoflash unit and for activating a buzzer in response to the light flash to inform the photographer that the flash did occur. The remaining patents disclose various types of control circuits for cameras using photoflash units and, in general, are concerned with ensuring that the proper film exposure is provided. In the systems disclosed in some of these patents, an alarm is activated when preset conditions are not met.

SUMMARY OF THE INVENTION

In accordance with the invention, a unit or device is provided for use in a camera system employing one or more flash or strobe units which, generally speaking, indicates to the camera operator whether or not the flash unit or units are operating properly and in proper synchronization with the operation of the camera. In addition, as explained below, the device preferably also controls activation of the flash unit or units in response to receiving a corresponding synchronization pulse from the camera.

According to a preferred embodiment of the invention, a control and alarm device is provided for a camera system including a camera for, when operated, producing a corresponding synchronizing control pulse, at least one flash or strobe unit, control means associated with the flash or strobe unit for controlling the operation of the flash or strobe unit, and at least one sensor for sensing the operating state of the strobe unit and for producing an output signal in accordance therewith, the control and alarm device comprising a first input for receiving input signals related to the synchronizing pulses produced by the camera; a second input for receiving output signals from the sensor; first signal conditioning means for conditioning the signals received at the first input; a second signal conditioning means for conditioning the signals received at the second input; output means, connected to the control means for said flash or strobe unit and to the first signal conditioning means, for producing an output signal for activating the control means responsive to receipt by the first input of a said input signal, first indicator means for indicating proper operation of the camera system, second indicator means for indicating improper operation of the camera system, and logic circuit means, connected to the outputs of the first and second signal conditioning means, for providing activation of said first indicator means responsive to a first set of signals from the signal conditioning means and for providing activation of the second indicator means responsive to a second set of signals from the signal conditioning means.

Preferably, the first and second signal conditioning means each comprises a level comparator for comparing the level of the signal at the associated input with a reference level and for producing a logic circuit compatible output pulse when that reference level is exceeded, i.e., for producing an output pulse compatible with the logic circuitry of the logic circuit means. Advantageously, timing circuitry is connected to the level comparator for controlling the duration of the logic circuit compatible output pulse.

The logic circuit means preferably comprises a logic circuit for providing activation of the first indicator means only when the outputs of said signal conditioning means indicate that proper signals are present in the proper sequence at both of the first and second inputs and for providing activation of the second indicator means only when the outputs of the signal conditioning means indicate that a proper signal is present at the first input and that an other than proper signal is present at the second input.

As discussed in more detail below, the second indicator means preferably comprises a visible indicator device and an audible indicator device. Further, the first indicator means also preferably comprises a visible indicator device and an audible indicator device, the latter of which is advantageously the same as that used as the audible indicator device of the second indicator means. In addition, in an advantageous embodiment, a switch means is provided for disabling the audible indicator device of first indicator means for purposes explained below.

Preferably, the output means comprises an output terminal, and a relay activated responsive to a predetermined output produced by the first signal conditioning means for modifying the voltage at the output terminal so as to provide activation of the strobe or flash unit.

Although, as discussed below, the invention is adapted for use in various camera systems, the invention is particularly applicable to camera systems which include a transmitter for transmitting camera synchronization pulses, a plurality of flash units which, in use, are adapted to be located remotely from the camera, and a plurality of receivers, each associated with an individual flash unit, for receiving synchronization pulses from the transmitter. In such a system, an individual device according to the invention is used with each flash unit.

As mentioned above, an important feature of the present invention is that a visual alert or indication is produced when the associated strobe or photoflash malfunctions. In addition, in accordance with a preferred embodiment, an audible indicator device is also provided as mentioned above which produces a long distinctive warning signal when the flash responsive signal does not arrive in proper time sequence with the camera synchronization pulse. It will be appreciated that the visual alert, in particular, is extremely important to a professional photographer because he is often working in noisy surroundings, e.g., at a party, wedding or where a band is playing. The audio alarm is also important to a photographer because he may have several strobes in operation at the same time and the alarm is advantageously made to be sufficiently long to enable the photographer to locate the malfunctioning strobe and to then take whatever remedial action that may be indicated. Further, because the photographer is very likely to be in a state of intense concentration, a long, and loud, sound or tone is helpful in alerting the photographer to any problem with one or more of the strobes that might exist.

A further important feature of the invention is that, as mentioned above, a visual alert is also provided, by the visible indicator device referred to previously, when the flash or strobe unit is functioning normally. This alert is preferably a short light flash (e.g. yellow or green) and provides the photographer with a visual assurance that the camera and strobe have both operated properly. In addition, in an advantageous embodiment, an audio signal is also provided when the strobe and camera both operate properly and in proper sequence which is different in duration from that produced when a malfunction occurs. Preferably, as mentioned above, a switch is provided so that the audio assurance tone can be "silenced", i.e., the alarm or indicator device disconnected, by the camera operator should he be working under circumstances where quiet is demanded or otherwise is indicated, such as in a church or at a wedding ceremony. This feature avoids annoying participants in a particular setting while the visual assurance light will still assure the photographer that all is well. Further, as stated, in accordance with a preferred embodiment, both visual and audio alerts are still provided in any event when a malfunction occurs.

One key feature of the invention is that the alarm and control device of the invention will only detect a single flash, i.e., a flash must occur within a preset time period after the arrival of the camera synchronization pulse. This feature is quite important in that it prevents other flashes or strobes that may be going off from falsely triggering the device. Further, as noted above, the device of the invention must receive a camera synchronization pulse in order to process the flash pulse information. To provide adequate directionality, the case of flash sensor can be modified to include a shield or the like for blocking light from other strobes arranged at various angles with respect thereto, and an on-board flash sensor is preferably aimed directly towards, and only towards, the associated strobe or flash unit which the sensor monitors. This permits individual alarm and control devices in accordance with the invention to be used with each strobe and provides an exact location of a failed or malfunctioning strobe. Further, with this arrangement, the device of the invention will operate both indoors and outdoors and under both daylight or nighttime conditions.

When incorporated in camera systems using transmission and receiving links in controlling a strobe or a plurality of strobes, the device of the invention monitors these links, and should the camera, transmitter and receiver malfunction, an alarm or alert, preferably both audible and visible, will be provided immediately. This feature is useful to a photographer in that, inter alia, it enables him to check the effective range of the transmitter and receiver by monitoring the audio and visual indicators to determine if the device of the invention is receiving proper synchronizing pulses from the camera.

A further important feature of the invention is that the device of the invention can detect when a strobe has a slow recycle time. To explain, when the battery or batteries associated with a strobe become weak, the recycle time of the strobe will be longer. Thus, under such conditions, where the camera operator activates the camera shutter release so that a synchronization pulse is generated, the flash sensor will detect the flash at later time than normal, and thus the output pulse from the flash sensor will not be received until after the device of the invention times out the period for the receipt of that pulse, which results in activation of the warning (indicator) device or devices.

According to a further important aspect of the invention, the device of the invention includes a flash or strobe control output for triggering a remote flash or strobe unit. As noted above, the device of the invention is particularly adapted for use with a system including a camera transmitter and a remote strobe receiver and the output provided is used to activate the receiver for the strobe and thereby eliminate the need for a second receiver to serve this purpose.

Although, as mentioned above, the invention is particularly adapted for use with camera systems which use remote strobes and interconnecting or linking transmitters and receivers, the invention can also be used directly with a camera and flash unit. In such a use, a flash sensor would be connected to one input and the synchronization pulse output of the camera to the other input.

Other features and advantages will be set forth in, or apparent from, the detailed description of a preferred embodiment which follows.

DESCRIPTION OF THE PREFERRED EMBODIMENTS

Figure 1:
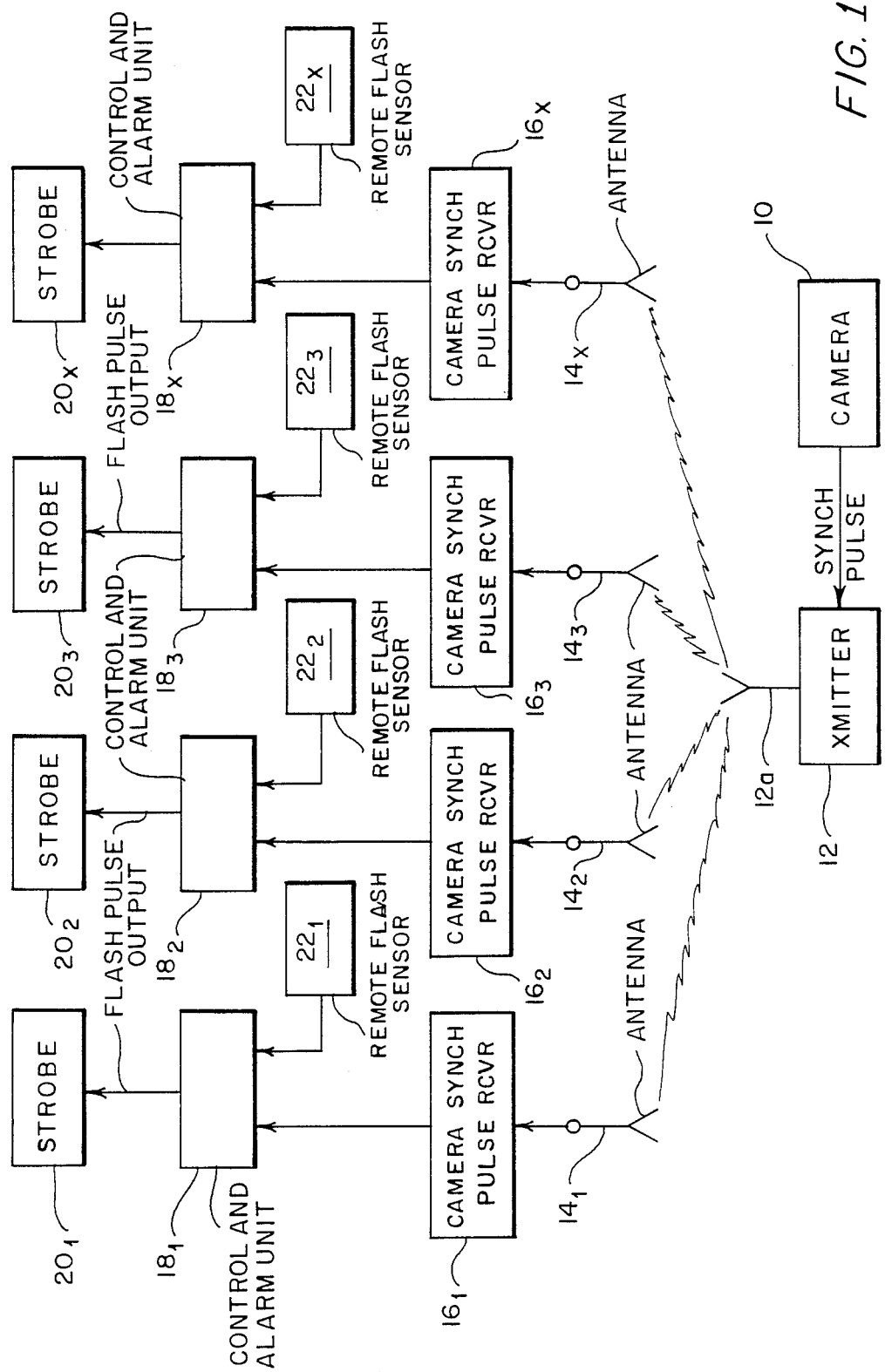
FIG. 1 is a block diagram of a camera system using remotely controlled strobes and incorporating a plurality of alarm and control devices in accordance with the invention.

Referring to FIG. 1, a schematic block diagram is shown of a camera system employing remotely controlled strobes and incorporating the alarm and control circuits or units of the invention. The system, as illustrated, is basically conventional apart from the incorporation of the control units of the invention therein and includes a camera 10, which is connected to and supplies synchronizing pulses to, a transmitter 12. Transmitter 12 transmits, by means of a transmitting antenna indicated at 12a, corresponding synchronizing pulses to a plurality of individual receiving antennas indicated at $14_1$, $14_2$, $14_3$, and $14_x$ associated respectively with corresponding camera synchronizing pulse receivers $16_1$, $16_2$, $16_3$, and $16_x$. The synchronizing pulse outputs of receivers $16_1$, $16_2$, $16_3$, and $16_x$ form respective inputs to a plurality of alarm and control units $18_1$, $18_2$, $18_3$, and $18_x$ constructed in accordance with the invention and described in more detail below in connection with FIG. 2. The individual outputs of control units $18_1$, $18_2$, $18_3$, and $18_x$ are connected to individual strobes $20_1$, $20_2$, $20_3$, and $20_x$ and each control unit receives, as a second input, the output of a corresponding remote flash sensor $22_1$, $22_2$, $22_3$ and $22_x$, each of which individually senses the flash from the associated strobes $20_1$, $20_2$, $20_3$ and $20_x$. It will be appreciated that the actual number of strobes used is decided upon by the camera operator, and more (or less) strobes can be used, as required or desired. The purpose and function of an alarm unit corresponding to units $18_1$, $18_2$, $18_3$, and $18_x$ are explained below in connection with FIG. 2.

Figure 2:
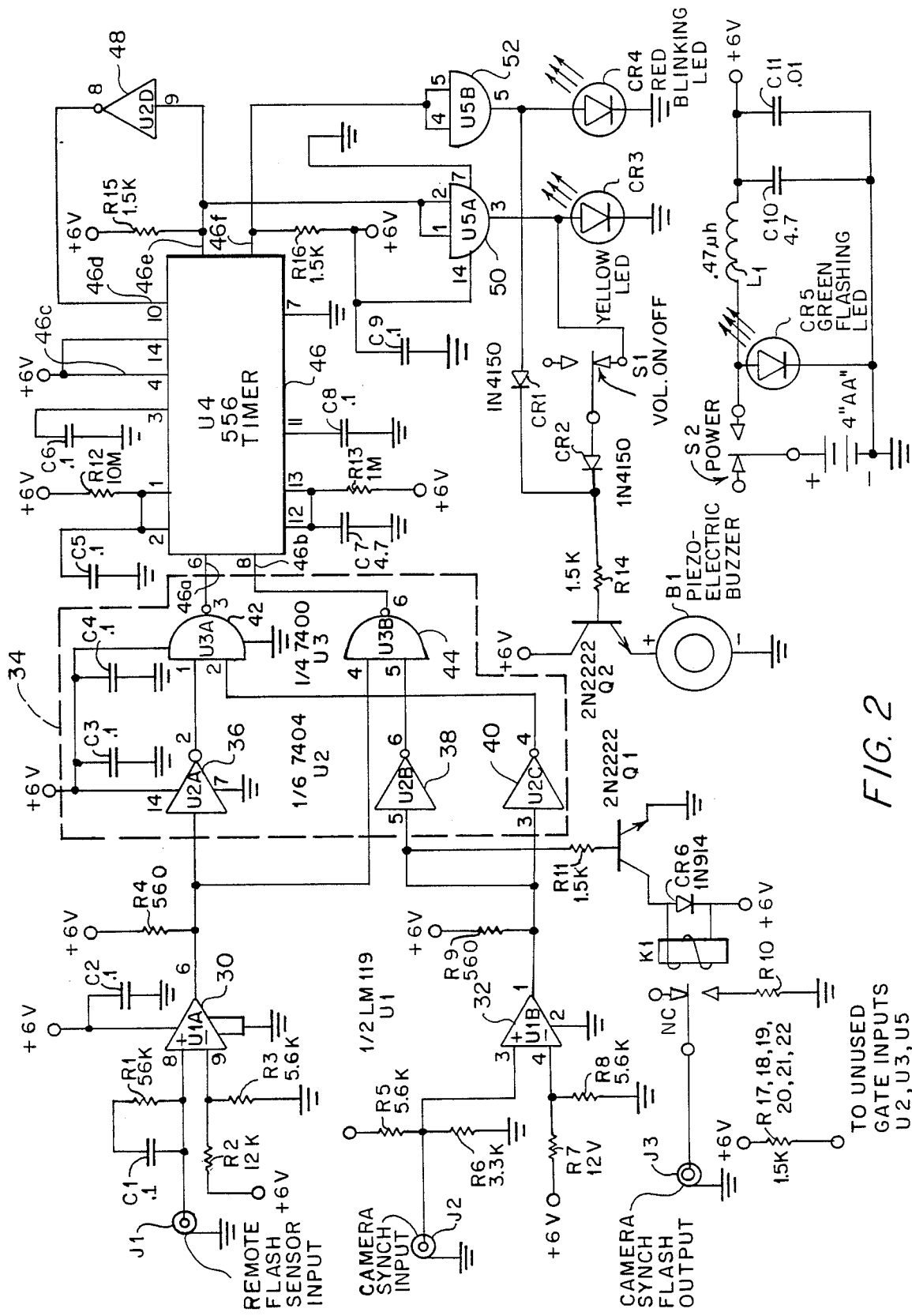
FIG. 2 is a schematic circuit diagram of a preferred embodiment of the invention.

Referring to FIG. 2, the alarm and control circuit illustrated includes first and second input terminals J1 and J2. Input terminal J1 receives the synchronization pulse output from a camera synchronizing pulse receiver as described above or from another source (i.e., directly from synchronization pulse output of the camera), while input terminal J2 receives the output of a strobe or flash sensor as described above.

Input terminal J1 is connected to one input of a first operational amplifier 30, connected as a level comparator, through a time constant circuit formed by resistor R1 and capacitor C1. The other input of operational amplifier 30 is connected to a voltage divider formed by resistors R2 and R3. With this circuit, an output from a remote strobe sensor received by terminal J1 causes comparator 30 to output a TTL compatible pulse of a time duration determined by resistor R1 and capacitor C1, and the level at which a comparator 30 is triggered from a low TTL level to a high TTL level, is determined by the voltage divider formed by sensors R2 and R3. The associated remote optical sensor (e.g. sensor $22_1$) is also reset.

Input terminal J2 is connected through a voltage divider network formed by resistors R5 and R6 to a first input of a further operational amplifier 32, also connected as a level comparator. A further voltage divider, formed by resistors R8 and R9, is connected to the second input of comparator 32. The voltage divider formed by resistor R5 and R6 is employed to make the triggering levels of comparator 32 compatible with the synchronization output levels of any standard or professional camera. The divider formed by resistors R7 and R8 is used to preset the level at which comparator 32 is triggered. The operation of this circuit is basically the same as that described above for comparator 30.

Resistors R4 and R9, connected to the respective outputs of comparators 30 and 32, serve as "pullups" on these outputs to ensure trouble-free operation.

The outputs of comparators 30 and 32 form the two inputs to a logic circuit 34 formed by three inverters 36, 38 and 40 and two NAND gates 42 and 44, which are connected as shown. The two outputs of logic circuit 34 are connected to the two trigger inputs 46a and 46b of a timer circuit 46. As will become apparent, the purpose of this circuitry is (1) to provide an indication that the appropriate strobe and camera synchronization pulses have been received, and received in the proper sequence, by supplying an appropriate input signal to input 46a of timer 46, and (2) to indicate improper operation or sequencing of the camera strobe events by supplying an input signal to the second input 46b of timer 46. This operation can best be understood by considering the two truth tables set forth below.

TRUTH TABLE I

| Output of 30 (strobe detector) | Output of 32 (synchchronization pulse detector) | Input to 46a (timer 46) |
|---|---|---|
| 0 | 0 | 0 |
| 0 | 1 | 1 |
| 1 | 0 | 1 |
| 1 | 1 | 1 |

It will be seen from Table I that one condition will produce the "zero" or low TTL level at input 46a of timer 46 required to trigger timer 46 and that is the condition where the outputs of both level comparators 30 and 32 are low indicating that the proper pulses are present within the detection period.

TRUTH TABLE II

| Output of 30 (strobe detector) | Output of 32 (synchronization pulse detector) | Input to 46b (timer 46) |
|---|---|---|
| 0 | 0 | 1 |
| 0 | 1 | 1 |
| 1 | 0 | 0 |
| 1 | 1 | 1 |

As is evident from Table II, a "zero" or low TTL activating input signal is supplied to input 46b of timer 46 only when a "good" (low) signal is produced by comparator 32 indicating that a camera synchronization pulse has been properly received and a "bad" (high) signal is produced by comparator 30 indicating that the strobe has failed to operate properly. This is important in that the photographer will wish only to be warned after he has, in fact, depressed the shutter release on his camera and fails to get the proper strobe. This approach also prevents the strobes of other photographers from influencing the control system of the invention in that the camera shutter must be operated in order to generate the required camera synchronization pulse.

Timer 46 (a 556 Dual Timer as indicated in the drawings) is used to control both visual and audio indicators as explained below. Each of the two sections of the timer is used as a monostable multivibrator (one-shot or flip-flop) and external capacitors C5 and C7 connected to timer 36 are initially held in a discharged state by a transistor (not shown) inside of timer 46. Upon the application to input 46a or 46b of a negative trigger pulse of less than a predetermined valve (less than ⅓ Vcc in specific example), the corresponding internal monostable multivibrator is set, which both removes the short circuit across the corresponding capacitor C5 or C7 and drives the output high. The voltage of the capacitor increases exponentially for a predetermined period (T=1.1R12C5 or T=1.1R13C7, where C5 and C7 represent the values of capacitors C5 and C7, and R12 and R13 represent the values of externally connected resistors R12 and R13) at which time the voltage is a higher valve (⅔ Vcc). An internal comparator then resets the monostable multivibrator within timer 36 which, in turn, discharges the corresponding capacitor C5 or C7 and drives the timer output to the low state thereof.

It is noted that during the timing cycle when the output of timer 46 is high, the application of a further trigger pulse will not affect the operation of the timer circuit. However, timer 46 can be reset by the application of a negative pulse to a reset terminal 46c or 46d.

The output of timer 46 will then remain low until a trigger pulse is again applied.

Timer 46 includes a pair of outputs 46e and 46f. An inverter 48 is connected from output 46c to reset input 46d so as to present a negative pulse to this input when the output at terminal 46e is high and thus prevent pulse triggering of output at 46f by so-called racing pulses when the output at 46e is high. It will be understood that the output at terminal 46e is high when there is a "good" condition detected for both the strobe and camera synch pulses. Resistors R15 and R16 are respectively connected between outputs 46e and 46f and the +6V supply.

To provide an indication of the "good" condition referred to above, output 46e is connected through a driver 50 to a light emitting diode CR3, which, in the embodiment under consideration, provides a yellow light, and through a switch S1, a diode CR2, a resistor R14 and a transistor Q2 to a piezoelectric buzzer B1 or other audible alarm. To provide an indication of a "bad" or failure condition, output 46f is connected through a further driver 52 to a further light emitting diode CR4, which provides a red blinking light. Driver 52 is also connected, through diode CR1, to buzzer B1, so that an audible alert is provided under both operating conditions. Switch S1 is provided to enable the operator to silence buzzer B1 should the operator wish silent operation as explained above. However, the visual indications by indicators CR3 and CR4 are always active, as is buzzer B1 insofar as a "bad" signal from output 46f is concerned, so that, as discussed previously, both an audible alarm and a visual alarm are produced when there is a failure.

A further connection is provided between the output of comparator 32 through a resistor R11 and a relay driver transistor Q1 to the input winding of a relay K1 having a diode CR6 connected thereacross. The normally closed contact of relay K1 is connected to a camera synchronization flash output terminal J3 while the other contact is connected through a resistor R10 to ground. With this arrangement, when a camera synchronization pulse is received, transistor Q1 momentarily activates relay K1 so as to connect terminal J3 to ground through resistor R10 and thus activate the flash or strobe connected to the control and alarm unit.

A series of resistors R17 to R22 are connected between the +6V power supply to the unused gate inputs of the inverter (V2), NAND gate (U3) and AND gate (U5) integrated circuits packages.

A power supply for control and alarm comprises a battery or batteries 54 connected to a power control switch S2, a shunt connected "power on" indicator light (light emitting diode) CR5, which provides a flashing green light, and associated power conditioning circuitry comprising inductor L1 and shunt capacitors C10 and C11. Further power line quieting is afforded by the use of various bypass capacitors provided for each integrated circuit e.g., capacitors C6 and C8 for timer 46.

Although the present invention has been described relative to a specific exemplary embodiment thereof, it will be understood by those skilled in the art that variations and modifications can be effected in this exemplary embodiment without departing from the scope and spirit of the invention.

We claim:

1. A control and alarm device for a camera system including a camera for, when operated, producing a corresponding synchronizing control pulse, at least one flash or strobe unit, control means for controlling the operation of said flash or strobe unit and at least one sensor for sensing the operating state of the strobe unit and for producing an output signal in accordance therewith, said control and alarm device comprising a first input for receiving input signals related to the synchronizing pulses produced by said camera, a second input for receiving output signals from said sensor, first signal conditioning means for conditioning the signals received at said first input; a second signal conditioning means for conditioning the signals received at said second input; output means, connected to said control means for said flash or strobe unit and to said first signal conditioning means, for producing an output signal for activating said control means responsive to receipt by said first input of a said input signal, first indicator means for indicating proper operation of the camera system, second indicator means for indicating improper operation of the camera system, and logic circuit means, connected to the outputs of said first and second signal conditioning means, for providing activation of said first indicator means responsive to a first set of signals from said signal conditioning means and for providing activation of said second indicator means responsive to a second set of signals from said signal conditioning means.

2. A device as claimed in claim 1 wherein said first and second signal conditioning means each comprises a level comparator for comparing the level of the signal at the associated input with a reference level and for producing a logic circuit compatible output pulse when said reference level is exceeded.

3. A device as claimed in claim 2 further comprising a timing circuit connected to said level comparator for controlling the duration of said logic circuit compatible output pulse.

4. A device as claimed in claim 1 wherein said logic circuit means comprises a logic circuit for providing activation of said first indicator means only when the outputs of said signal conditioning means indicate that proper signals are present in the proper sequence at both of said first and second inputs and for providing activation of said second indicator means only when the outputs of said signal conditioning means indicate that a proper signal is present at said first input and that an other than proper signal is present at said second input.

5. A device as claimed in claim 1 wherein said second indicator means comprises a visible indicator device and an audible indicator device.

6. A device as claimed in claim 1 wherein said first and second indicator means each comprises a visible indicator device and an audible indicator device.

7. A device as claimed in claim 6 further comprising switch means for disabling the audible indicator device of said first indicator means.

8. A device as claimed in claim 1 wherein said output means comprises an output terminal and a relay activated responsive to a predetermined output produced by said first signal conditioning means for modifying the voltage at said output terminal.

9. A device as claimed in claim 1 wherein said camera system includes a transmitter for transmitting camera synchronization pulses, a plurality of said flash units which, in use, are adapted to be located remotely from said camera and a plurality of receivers, each associated with an individual flash unit, for receiving synchronization pulses from said transmitter.

10. An indication and control device for a camera system including a camera which, when operated, produces a synchronization pulse, a flash unit, and a sensor for sensing the operation of the flash unit and for producing an output in accordance therewith, said indication and control device comprising:
- input means for receiving a said output from said sensor and for producing a first output signal in accordance therewith;
- a second input means for receiving an input in response to the production of a synchronizing pulse by said camera and for producing a second output signal responsive to receiving a said input;
- a timer having a first trigger input for triggering a first output and a second trigger input for triggering a second output;
- first indicator means, connected to said first output of said timer, for indicating when the flash unit and the camera function properly;
- second indicator means, connected to said second output of said timer, for indicating when the camera and flash unit malfunction;
- logic circuit means for providing a triggering signal at said first trigger input only when said first and second output signals are present at the same time and for providing a triggering signal at said second trigger input only when a second output signal is present and there is no first output signal present.

11. A device as claimed in claim 10 further comprising output means, connected to said second input means and to said flash unit, for controlling activation of said flash unit responsive to the receipt of a said input by said second input means.

12. A camera system including a camera which, when operated, produces a synchronization pulse, a transmitter for transmitting such synchronization pulses, a plurality of flash units, a like plurality of sensors individaully associated with respective ones of said flash units for sensing the operation of the corresponding flash unit and for producing an output in accordance therewith, a like plurality of receivers each individually associated with a respective flash unit, for receiving synchronizing pulses from said transmitter and a like plurality of indication and control devices individually associated with said receivers and said flash units, each said indication and control device comprising:
- input means for receiving a said output from an associated said sensor and for producing a first output signal in accordance therewith;
- a second input means for receiving an input produced by an associated said reciever in response to the production of a synchronizing pulse by said camera and for producing a second output signal responsive to receiving a said input;
- a timer having a first trigger input for triggering a first output and a second trigger input for triggering a second output;
- first indicator means, connected to said first output of said timer, for indicating when the associated flash unit and the camera function properly;
- second indicator means, connected to said second output of said timer, for indicating when the associated flash unit and the camera malfunction;
- logic circuit means for providing a triggering signal at said first trigger input only when said first and second output signals are present at the same time and for providing a triggering signal at said second trigger input only when a second output signal is present and there is no first output signal present.

* * * * *